(12) United States Patent
Johnson et al.

(10) Patent No.: US 9,360,075 B2
(45) Date of Patent: Jun. 7, 2016

(54) VIBRATION ISOLATION SYSTEM AND METHOD

(75) Inventors: Conor D. Johnson, Belmont, CA (US); John M. Howat, San Carlos, CA (US); Paul S. Wilke, Medford, OR (US)

(73) Assignee: Moog Inc., East Aurora, NY (US)

( * ) Notice: Subject to any disclaimer, the term of this patent is extended or adjusted under 35 U.S.C. 154(b) by 188 days.

(21) Appl. No.: 14/002,027

(22) PCT Filed: Nov. 1, 2011

(86) PCT No.: PCT/US2011/058775
§ 371 (c)(1),
(2), (4) Date: Oct. 28, 2013

(87) PCT Pub. No.: WO2013/066319
PCT Pub. Date: May 10, 2013

(65) Prior Publication Data
US 2014/0084527 A1     Mar. 27, 2014

(51) Int. Cl.
*F16F 9/30*  (2006.01)
*B64G 1/64*  (2006.01)
*B64G 1/22*  (2006.01)

(52) U.S. Cl.
CPC ............... *F16F 9/306* (2013.01); *B64G 1/641* (2013.01); *B64G 2001/228* (2013.01)

(58) Field of Classification Search
CPC .. B64G 1/002; B64G 1/641; B64G 2001/228; F16F 9/306
See application file for complete search history.

(56) References Cited

U.S. PATENT DOCUMENTS

| | | | | |
|---|---|---|---|---|
| 3,314,502 A | * | 4/1967 | Thorn | F16F 1/3605 188/268 |
| 5,710,396 A | * | 1/1998 | Rogers | F16F 15/00 181/208 |
| 6,290,183 B1 | * | 9/2001 | Johnson | B64G 1/641 244/170 |
| 7,249,756 B1 | * | 7/2007 | Wilke | F16F 7/10 244/173.2 |

* cited by examiner

*Primary Examiner* — Vishal Sahni
(74) *Attorney, Agent, or Firm* — Phillips Lytle LLP

(57) ABSTRACT

A vibration isolator (100) includes a flexure (102), a constrained VEM layer coupler (104), and a constrained VEM layer (106) configured to oppose relative translational and rotational motion between points of the flexure. The flexure may be a loop flexure and may include multiple loops that may be elliptical, circular, rectangular or square in overall aspect, for example. In multi-loop embodiments, the loops may share a common major axis or their major axes may be at an angle to one another. The device enhances damping by providing an increase in viscoelastic surface area over that available in the surface area of the flexure and provides a method of adjusting the strain in the VEM as the flexure undergoes deflection.

28 Claims, 5 Drawing Sheets

VIBRATION ISOLATION SYSTEM AND METHOD

TECHNICAL FIELD

Disclosed subject matter is related to the suppression of unwanted vibrations, including noise, in man-made structures. Structures in which vibrations suppression may be employed include: spacecraft payloads; launch vehicles; items transported via ground, sea, or air; or stationary objects, such as precision metrological or manufacturing instruments, for example.

BACKGROUND ART

Vibration suppression may be important in any field where performance, precision, or durability may be affected by unwanted movement. Although it is critically important in aerospace applications, vibration suppression may also be employed to advantage in terrestrial transportation, manufacturing, manufactured goods (e.g., computer disk drives), metrological instrumentation and medical instruments, for example. Passive damping, which reduces a structure's vibration amplitudes at resonances, is one primary means of suppressing unwanted vibrations. By reducing the amplitude of vibration amplitudes at resonances, damping decreases stresses, displacements, fatigue, and sound radiation. Vibration isolation is another major approach to reduce the vibration effects on payloads and structures. Vibration isolation acts as a filter to reduce the transmission of vibration energy across the isolator. Vibration isolators are used between two structures or components to isolate motion changes of one component to the other. Vibration isolation systems also require passive damping to damp the resonances of the payload at the "isolation or resonance frequencies".

U.S. Pat. No. 6,199,801 discloses a passively damped vibration isolation device with high strength and linear-elastic performance. The device of U.S. Pat. No. 6,199,801 remains relatively stiff against lateral loading as compared to its longitudinal loading.

U.S. Pat. No. 6,290,183 discloses a three-axis vibration isolation device that provides independently controllable, high strength, linearly elastic, multiple-axis compliance but with some sacrifice to longitudinal compactness. Damping within the device is also limited to the constrained-layer-on-beam-bending damping approach of the time, and effective primarily for longitudinal motions.

U.S. Pat. No. 7,249,756 addresses the need for a passive, highly damped vibration isolation device which provides independent and widely controllable compliance in all directions of vibration loading without sacrifice to strength and linearity of behavior, and without sacrifice to compactness or weight. The device of U.S. Pat. No. 7,249,756 is a low profile, passively and highly damped, vibration isolation mount which in multiplicity provides a complete vibration load isolation mounting system. It provides an independently determinable compliance in all directions of vibration loading without sacrifice to strength and linearity of behavior, and without significant sacrifice to compactness of the payload-vehicle interface or to weight. It provides substantial damping and resulting reduction in vibration load transmission from support base to payload by utilizing a shear wall type constrained layer damping. Each of U.S. Pat. Nos. 6,199,801, 6,290,183 and 7,249,756 are incorporated in their entirety herein by reference.

BRIEF SUMMARY OF THE INVENTION

The present invention relates to passively damped, vibration and shock load isolation apparatus suitable for use in protecting hardware and payloads from damaging vibration and shock loads, particularly those extreme loads seen in spacecraft launch systems. In an illustrative apparatus and method in accordance with the principles of claimed subject matter, a vibration isolator includes a flexure, a constrained layer of viscoelastic material (VEM), and a coupler that is relatively rigid in comparison to the flexure and that couples the flexure and constrained layer of VEM to damp relative translational and rotational motion within the flexure. In an illustrative embodiment, a vibration isolator includes a plurality of relatively rigid members (also referred to herein as "posts") to couple the flexure and constrained VEM layer, with the posts arranged to couple the constrained layer of VEM to the flexure in a manner to oppose relative motion between the points of the flexure at which the posts are attached.

In an illustrative embodiment, a vibration isolator includes a loop flexure, a constrained layer of viscoelastic material (VEM) and a plurality of posts arranged to couple the constrained layer of VEM to the flexure in a manner to oppose relative motion between the points of the flexure at which the posts are attached. In an illustrative embodiment, the posts are attached to the loop flexure on the inside surface of the loop flexure. For purposes of the following discussion the post-ends closest to the flexure to which they are attached will be referred to as proximal ends and the post-ends farthest from the flexure to which they are attached will be referred to as distal ends. The posts may include regions, at their distal ends, for example, that are expanded to provide greater surface area for VEM layer attachment.

Such regions are referred to herein as "pads". These pads allow more surface area of VEM to be included in the isolator, thereby increasing the potential for increased damping or less strain in the VEM. The loop flexure may be of any type, including elliptical, circular or rectangular, for example. The combination of a post and pad may be referred to herein as a "bridge".

In such an embodiment, the posts may be attached to the flexure in any arrangement such that, in combination with the VEM, they provide opposition to translational and/or rotational motion within the flexure. Such motion may be due to compliance of the flexure in response to loading between bodies for which the vibration isolator is to provide vibration damping. To that end, the attachment points may be positioned to provide motion-opposition ranging from a maximum with the attachment points opposite one another and aligned with the longitudinal axis of the flexure, to lesser values of motion-opposition with the attachment points not in-line with one another and/or not aligned with the longitudinal axis of the flexure.

Shearing strain may be generated within the VEM from rotational motion differences of the points on the flexure where the posts are joined. The rotations at these proximal ends of the posts are carried through the relatively rigid posts to the distal ends of the posts and in the pad areas. The resulting rotational differences between the pads serve to magnify the shearing strain developed in the VEM beyond that associated with translation differences alone.

In another illustrative embodiment, a vibration isolator includes a multi-loop flexure, a constrained layer of viscoelastic material (VEM) for each loop, and a plurality of posts arranged to couple the constrained layers of VEM to the flexures in a manner to oppose relative motion (translational and/or rotational) between the points of the flexures at which the posts are attached. In an illustrative embodiment, the posts may be attached to the loop flexures on the inside surfaces of the loop flexures. The posts may include regions, at their distal ends, for example, that are expanded to provide greater surface area for VEM layer attachment. The loop flexures may be of any type, including elliptical, circular or rectangular, for example, and may be aligned along a common axis or may be aligned along intersecting axes. Each loop flexure may include a plurality of loops.

In another illustrative embodiment, a vibration isolator may include, in addition to a constrained VEM layer coupler, a constrained VEM layer that may extend to all, or a portion, of a flexure exterior.

In another illustrative embodiment, posts and tabs used in a constrained VEM layer coupler may be used to directly constrain a VEM layer, so that, for example, a constrained VEM layer is applied to and sandwiched directly between two end-tabs, rather than being built up of an end tab, a VEM layer, and a separate, applied, constraining layer.

In another illustrative embodiment, a vibration isolator includes a single, circular loop flexure having interior and exterior surfaces. First and second posts are attached to the interior surface of the flexure at their proximal ends and their distal ends include expanded regions, or tabs, for the attachment of VEM. In this illustrative embodiment, a VEM layer is attached to each side of the expanded region of each distal post-end. Two constraining layers, one on each side of the expanded regions of the distal post-ends, are attached to cover the VEM layers.

In another illustrative embodiment, a vibration isolator includes two elliptical loop flexures, each having interior and exterior surfaces. First and second posts are attached to the interior surface of each flexure at their proximal ends and their distal ends include expanded regions, or tabs, for the attachment of VEM. In this illustrative embodiment, a VEM layer is attached to each side of the expanded region of each distal post-end. Four constraining layers, one on each side of the expanded regions of the distal post-ends, are attached to cover the VEM layers.

A plurality of vibration isolators may be used to provide a compact, light-weight vibration load isolation mounting system, for example. A load isolation mounting system employing such vibration isolators may provide an independently determinable compliance in all directions of vibration loading while maintaining both strength and linearity and without significant sacrifice to compactness of the payload-vehicle interface or to weight. The vibration isolator's shear wall type constrained layer damping provides a significant reduction in vibration load transmission from a support base to a payload, for example.

In an illustrative embodiment, a flexure element that is optionally of one-piece construction, but may also be of assembled form, may be used in the assembled device. A payload may attach to an upper flexure section and a launch vehicle or support structure or base may attach to a lower flexure section of the mount's flexure element. The position and general directional relationship of the payload relative to the support defines the commonly understood longitudinal direction of the combined payload and support base, and similarly the upper flexure section and lower flexure sections are considered generally aligned to this longitudinal direction or axis, and herein are so described. The longitudinal axis of the combined payload and support, or that of a launch vehicle, may however be defined in any direction for which loading occurs and for which vibration isolation may be desired for implementation. Thereby the description of the disclosed invention as being generally aligned to a common longitudinal axis is not to be construed as being a constraint to any space fixed axis.

The device maintains the advantages of affording particularly prescribed longitudinal and lateral compliances with significant passive damping, and maintaining the advantage of a very modest longitudinal profile when interfaced between a payload and its support structure or vehicle. The device allows the shaping of the flexure element contours so to minimize the increase in the payload's effective plan profile and concomitantly to allow spacecraft-to-fairing clearances to not appreciably increase or increase at all.

BRIEF DESCRIPTION OF THE DRAWINGS

Non-limiting and non-exhaustive embodiments will be described with reference to the following figures, wherein like reference numerals refer to like parts throughout the various figures unless otherwise specified.

DETAILED DESCRIPTION OF THE PREFERRED EMBODIMENTS

Figure 1:
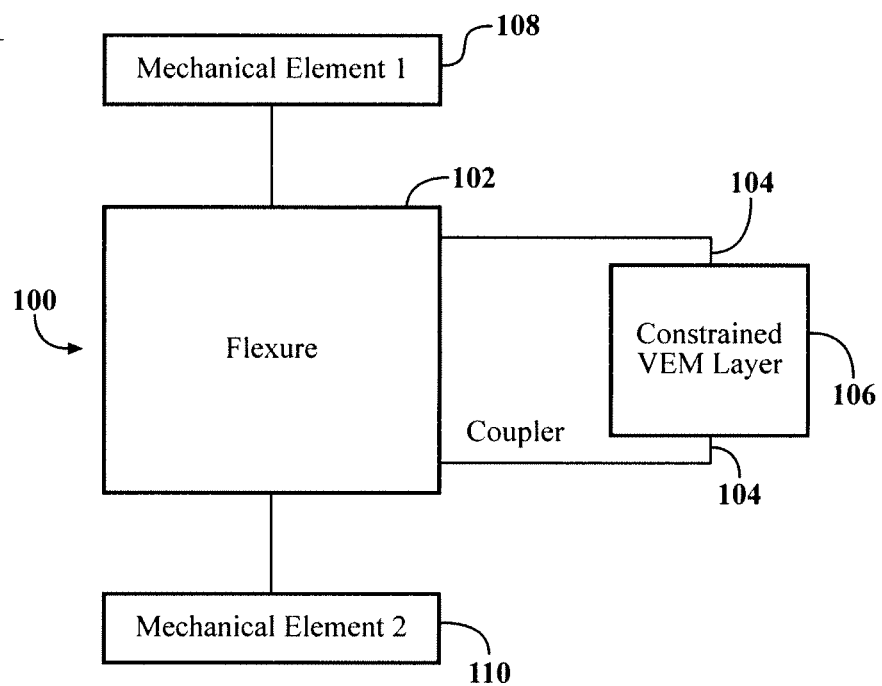
FIG. 1 is a block diagram of a mechanical system that employs an embodiment of a vibration isolator in accordance with the principles of the present invention.

Although claimed subject matter will be described in terms of certain embodiments, other embodiments, including embodiments that do not provide all of the benefits and features set forth herein, are also within the scope of this invention. Various structural, logical, and process step changes may be made without departing from the spirit or scope of the invention. References to compass directions, "up," "down," "upper," "lower," "top," and "bottom" are meant for illustrative purposes only and not to limit the orientation of illustrative embodiments or elements of illustrative embodiments in accordance with the principles of claimed subject matter. Accordingly, the scope of the invention is defined only by reference to the appended claims FIG. 1 provides a block diagram illustration of an embodiment 100 of a vibration isolator in accordance with the principles of the present invention in a multi-element mechanical system. In this embodiment, vibration isolator 100 provides vibration isolation between mechanical element 108 and mechanical element 110. The vibration isolator 100 includes a flexure 102, a constrained viscoelastic material (VEM) layer coupler 104, and a constrained VEM layer 106. In illustrative embodiments the flexure 102 may be a low profile flexure, for example. The VEM layer coupler 104 couples the flexure to a constrained VEM layer 106 to damp relative motion within flexure 102 in which motion is set up by relative motion between mechanical elements 108 and 110.

The VEM layer coupler 104 may include a plurality of relatively rigid members, or posts, arranged to couple the constrained VEM layer 106 to the flexure 102 in a manner to oppose relative motion between the points of the flexure 102 at which the posts are attached. In illustrative embodiments the posts may be attached to the loop flexure 102 on the inside or outside surface of the loop flexure. For purposes of the following discussion the post-ends closest to the flexure to which they are attached will be referred to as proximal ends and the post-ends farthest from the flexure to which they are attached will be referred to as distal ends. The posts may include regions, at their distal ends, for example, that are expanded to form pads that provide greater surface area for VEM layer attachment.

Vibration isolator 100 may be implemented as a compact, light-weight, high strength, linear elastic mount that provides substantial passive damping and vibration isolation in a load path. A plurality of such isolators may be employed to form a mount, for spacecraft launch vehicles for example, that provides independent, controllable, wide-ranging compliance in all directions. The loop flexure 102 may be of any type, including elliptical, circular, or rectangular, for example, and may include one or more loops. The constrained VEM layer 106 adds both stiffness and damping to the flexure 102, but less additional stiffness than other constrained VEM layer approaches might. For local isolator vibration modes that affect system performance at high frequencies, referred to herein as surge modes, vibration isolator 100 may yield higher-frequency surge modes for a given amount of damping. Additionally, because the pad area, and corresponding constrained-layer area, may be of a wide range of sizes, greater latitude in the degree of damping may be afforded to a designer who employs such a vibration isolator 100.

The flexure 102 may be of one-piece construction or of assembled form, for example. In accordance with the principles of the present invention, a constrained VEM layer 106 is oriented to effect a shear wall that opposes the relative motion of the parts of the flexure to which it is rigidly coupled and thereby damps that motion. In turn, the vibration isolator 100 damps the relative motion of mechanical elements 108, 110. The constrained VEM layer 106 thereby opposes the relative motion between flexure sections. The relative movement of the flexure sections, although minor, may impart significant shear into the constrained VEM layer 106 and, consequently, considerable damping. Critical design parameters for the constrained VEM layer include: the thickness of the constraining layer, the elastic modulus of the constraining layer, the thickness of the VEM layer, the area of the VEM, the shear modulus of the VEM layer and the placement of the constrained layer, all of which may be determined through modeling or empirically, for example. For applications where weight is a serious consideration, advanced materials, such as metal matrix or graphite epoxy may be used for a constraining layer. In applications where weight is less critical, a more prosaic material, such as aluminum, may be used for the constraining layer.

As will be described in the discussion related to the following figures, the flexure 102 may be formed of one or more loops, for example. The loops may be generally elliptical (including circular loops), or rectangular in overall aspect. In multi-loop embodiments one or more loops may or may not share major axes with one or more other loops, depending upon form factor design constraints. Each flexure loop may be described as having an upper and lower segment, with respective upper and lower attachment means, which attachment means may be shared among a plurality of loops within one flexure 102. Such flexure loops allow for both longitudinal and lateral compliance. In illustrative embodiments, the distance between the upper and lower attachment-proximate portions of a loop flexure are spaced apart by a controlled distance. This controlled distance may be set at a minimum in order to minimize the overall profile of system that is subject to unwanted vibrations. The minimum distance value may be determined by evaluating the mass of components to be isolated, static loads, the deflection of the isolator, and the anticipated magnitude of vibration loads, for example.

In a spacecraft/launch vehicle application, for example, with a spacecraft embodying mechanical element 108 and a launch vehicle embodying mechanical element 110, a plurality of vibration isolators 100 may be employed to couple the spacecraft to the launch vehicle. In such an example, the longitudinal direction will be referred to herein as along the major axis of the launch vehicle. By minimizing the controlled distance between the attachment-proximate portions of the flexure loops (i.e., the portions of the loop where the flexure attaches to the spacecraft and to the launch vehicle), the contribution of the vibration isolation system to the longitudinal profile of the system may be minimized.

In illustrative embodiments flexures 102 may be composed, entirely or partially, of a high-strength material, such as aluminum, titanium, or steel, for example. Use of such high-strength materials yields a more durable and reliable means for connecting elements of a system, such as a payload/launch vehicle system. The use of high-strength flexure loops not only guarantees a more durable and reliable connection/support means, it also provides for linear deflection characteristics: yet another advantage over conventional damping treatments that employ elastomers in the load path. As will become more evident from the following figures and discussion, a constrained VEM layer 106 operates not in series with, but parallel to, a system's load path.

Figure 2:
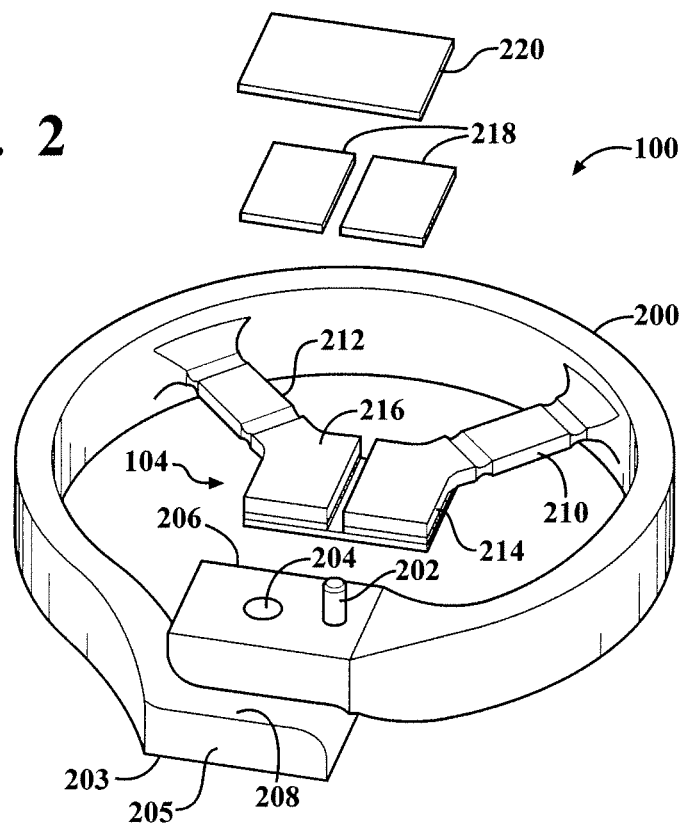
FIG. 2 is an exploded view of an illustrative, single-loop embodiment of a vibration isolator in accordance with the principles of the present invention.

In the illustrative embodiment of FIG. 2, a vibration isolator 100 includes a single-loop flexure 200 having studs 202, 203 (partially obscured) and holes 204, 205 (partially obscured) attachment means formed in respective tabs 206, 208 for attachment to system elements that are subject to vibration (such elements may be, for example, spacecraft structure and spacecraft component). In this illustrative embodiment, the stud 202 and hole 204 attachment means attach to one element of a system (e.g., a launch vehicle) and stud 203 and hole 205 attachment means attach to the other element of a system (e.g., spacecraft) for which vibration damping is desired. A constrained layer coupler 104 includes posts 210 and 212, which are situated to couple movement of the flexure 200 to tabs 214 and 216. In this illustrative embodiment, four VEM layers 218 are attached to the tabs 214, 216, one on each side of the two tabs. Two constraining layers 220 are attached to the VEM layers 218, thereby forming constrained VEM layers in which relative motion of the attachment points of the posts 210, 212 deforms the VEM layers, thereby coupling vibration energy from the flexure 200 into the VEM layers 218 and shearing the VEM layers 218. The shearing action imparts vibration energy to the constrained VEM layers 218, which absorb and dissipate the vibration energy in the form of heat, thereby damping the motion of the flexure tabs 206, 208 and the mechanical elements to which they are attached. Although shown inside the loop of the flexure in this illustrative embodiment, other embodiments within the scope of claimed subject matter allow for the constrained VEM layer coupler (e.g., posts 210, 212 and tabs 214, 216) and constrained VEM layer(s) to be positioned outside the loop, for example. In such an embodiment, the posts may be attached to the flexure in any arrangement that provides opposition to translational motion within the flexure. Such motion may be due to compliance of the flexure in response to loading between bodies for which the vibration isolator is to provide vibration damping. To that end, the attachment points may be positioned to provide motion-opposition ranging from a maximum with the attachment points opposite one another of the flexure 200, to lesser values of motion-opposition with the attachment points not in-line with one another of the flexure 200. In this and other illustrative embodiments, a constrained layer of VEM material may also be attached to the perimeter of the flexure 200, in the manner disclosed in U.S. Pat. No. 7,249,756.

Figure 3:
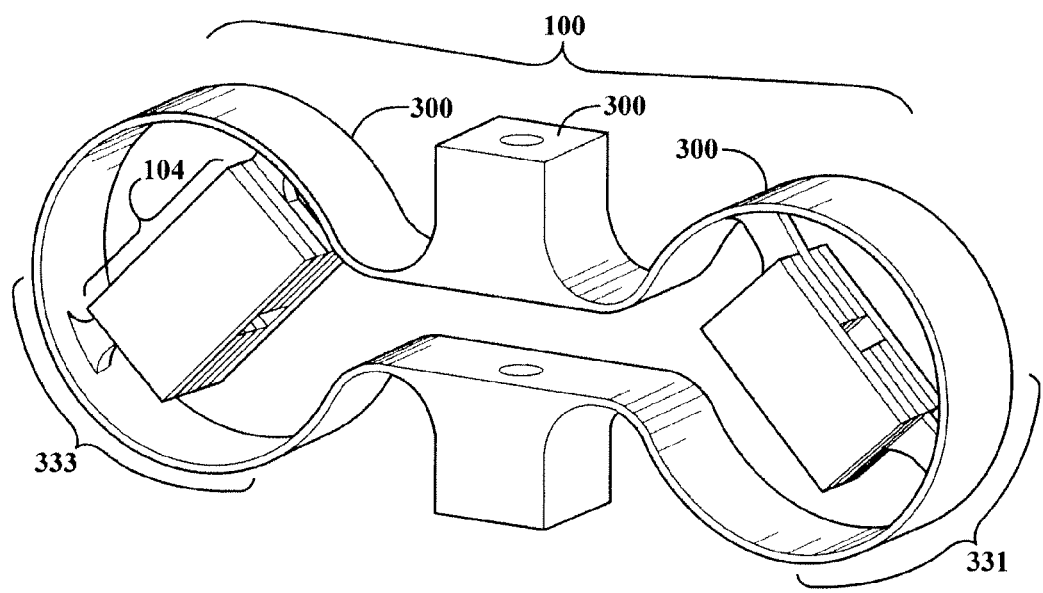
FIG. 3 is an exploded view of an illustrative, double-loop embodiment of a vibration isolator in accordance with the principles of the present invention.
Figure 4:
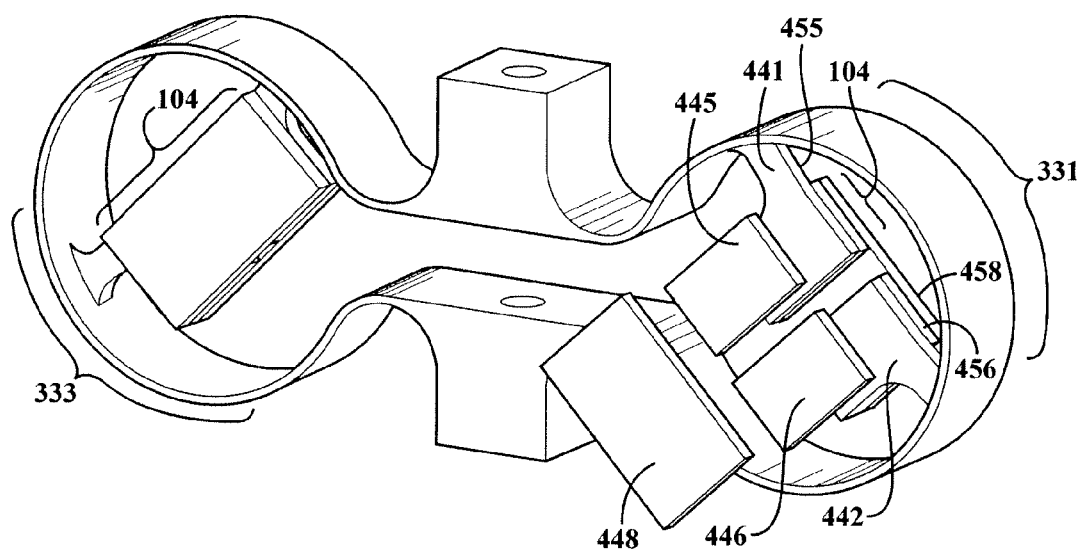
FIG. 4 is a partial exploded view of the vibration isolation mount of FIG. 3.

FIG. 3 depicts an illustrative embodiment of a dual-loop flexure constrained VEM layer vibration isolator 100. The vibration isolator 100 may be employed, for example, as an isolation mount. For device 100 shown in FIG. 3, a partially exploded view of this embodiment is shown in FIG. 4. As shown in FIG. 3, the assembled vibration isolator 100 includes a flexure element 300 and couplers 104 (also referred to herein as bridges 104). The flexure element 300 includes loop sections 331 and 333.

FIG. 4 shows the relationship of the VEM and stiff constraining layers included within bridge 104 within flexure loop 331 of flexure element 300. In the exploded portion of the view, bridge sections 441 and 442 extend from the flexure loop 331 towards one another. VEM layer segments 445 and 446 attach to bridge sections 441 and 442 respectively. Constraining layer 448 attaches to the opposite face of VEM layer segments 445 and 446 and spans across and completes bridge 104 so that motion of bridge section 441 relative to the bridge section 442 causes shearing of the VEM layer segments 445 and 446.

In the illustrative embodiment of FIGS. 3 and 4, additional VEM layer segments 455 and 456 combine with constraining layer 458 and attach in similar fashion to the opposite sides of bridge sections 441 and 442, thereby effecting a symmetric layering of VEM layers and constraining layers about the bridge sections 441 and 442.

Figure 5:
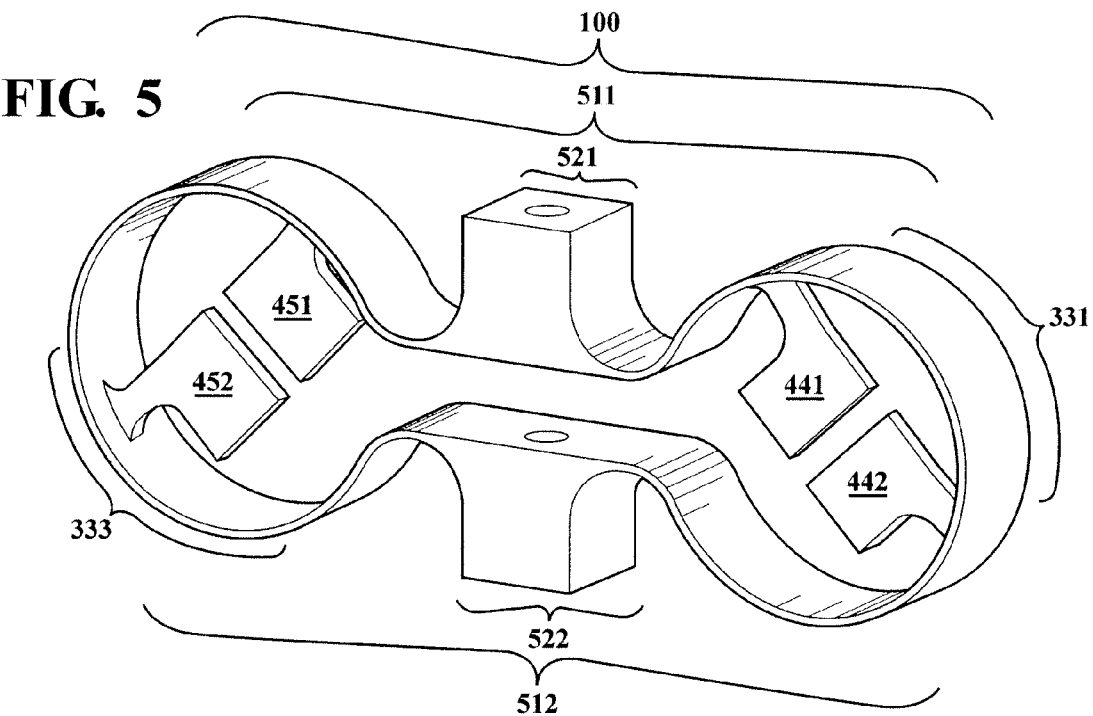
FIG. 5 is an isometric view of the flexure element comprised within the vibration isolation mount of FIG. 3.

For the illustrative embodiment of FIG. 3, FIG. 5 shows the flexure element 300 as configured within the vibration isolator 100. The flexure element 300 includes upper and lower flexure sections 511 and 512 with each having attachment means and attachment proximate portions 521 and 522. Spanning between the upper and lower flexure sections 511 and 512 are the flexure loop sections 331 and 333 as seen in FIG. 3. Flexure element 300 of this illustrative embodiment is of one-piece construction, and, as a result, the flexure loop sections 331 and 333 transition smoothly and jointlessly into the attachment proximate portions 521 and 522 of the upper and lower flexure sections 511 and 512, respectively. Bridge sections 441 and 442 extend from and within flexure loop 331, bridge sections 151 and 152 extend from and within flexure loop 333, and when subsequently joined by VEM and constraining layers, effect the damping bridges 104.

As seen in FIG. 5, the attachment proximate portion 521 of the upper flexure section 511 is spaced a relatively small distance from the attachment proximate portion 522 of the lower flexure section 512. This small spacing is free to be set at a minimal controlled distance so to allow the very low profile attribute of the isolation mount 100, yet still provide the necessary amount of longitudinal motion required of the payload relative to the support structure for vibration isolation.

The flexure loop sections, which may be theoretically as little as one, or more commonly placed in pairs spaced symmetrically about the attachment proximate portions of the upper and lower flexure sections, can be varied in size, shape, and cross section independently from the attachment proximate portions of the upper and lower flexure sections and independently from the minimal controlled distance between the attachment proximate portions. This characteristic of the invention maintains from the invention of U.S. Pat, No. 7,249, 756 the freedom and means to introduce both longitudinal and lateral compliances in sufficient and commensurate degree such that vibration isolation can be comparably achieved in all axes of motion.

The flexure element 300 through its incorporation of the flexure loop sections, allows both longitudinal and lateral motion of the upper flexure section 511 relative to the lower flexure section 512. Within any portion of the flexure loop section, which may be largely within the upper flexure section as in the present embodiment, a damped portion may be selected and affected by the incorporation of the damping. The relative motion between the first and second sections within each bridge is then imparted into the VEM layer. The resulting VEM layer deformation results in significant induced damping for all axes of vibration.

In another illustrative embodiment, damping in the lateral direction may be further increased by bridging laterally between flexure loops. A VEM layer and an accompanying constraining layer are placed across the bridge sections between neighboring loop sections. The spacing between posts 521, 522 in FIG. 5 may be set at a relatively small controlled distance in order to provide a relatively low profile combination of attached elements. Such a low-profile configuration may be particularly important in a systems where one or more of the vibration isolators 100 is employed as an isolation mount between a spacecraft and launch vehicle, for example. The spacing may be set at a relatively small controlled distance that provides for a low profile system, yet allows for longitudinal motion between the spacecraft and launch vehicle.

Flexure loops 331 and 332 may vary in size, shape, and cross-section, independently from the attachment proximate portions of the upper and lower flexure sections (that is, those flexure regions proximate posts 521 and 522) and without altering the controlled separation between the attachment proximate sections of the flexure 300. This design flexibility allows a flexure loop 331, 333 to introduce longitudinal and lateral compliances in a manner that allows for vibration isolation in all axes of motion.

Figure 6:
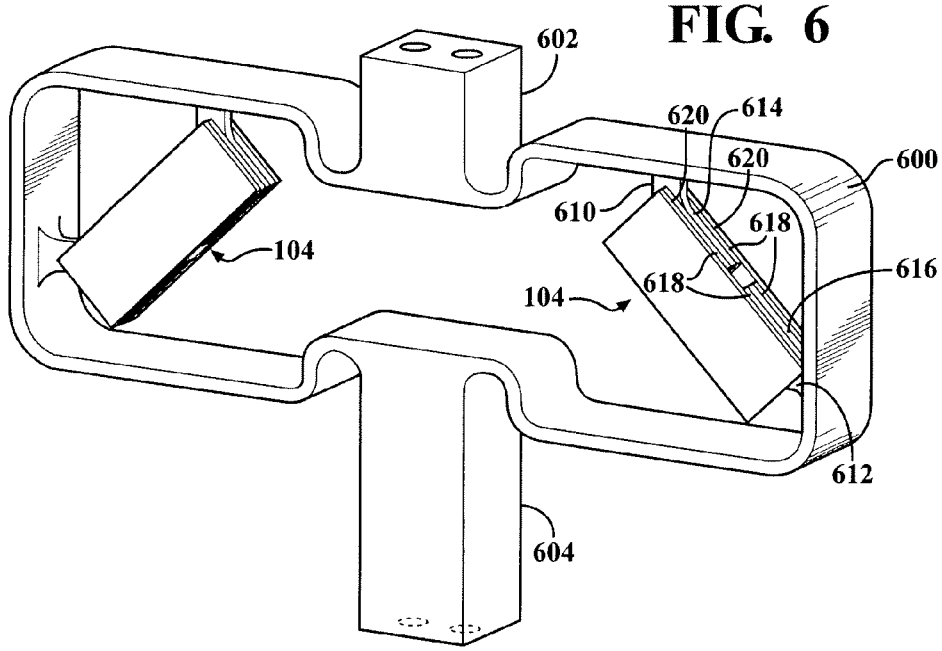
FIG. 6 is an exploded view of an illustrative, double-rectangular-loop embodiment of a vibration isolator in accordance with the principles of the present invention.

FIG. 6 depicts an illustrative embodiment of a dual-rectangular-loop constrained VEM flexure vibration isolator 100. In this illustrative embodiment, a dual-loop flexure 600 includes system attachment posts 602, 604 for attachment to system elements that are to be vibrationally isolated. The two loops of the flexure 600 are generally rectangular in shape. Two constrained layer couplers 104 include two posts 610, 612 and end-tabs 614, 616 each. As with the previous illustrative embodiments, the constrained layer couplers 104 couple relative translational movement between the posts' 610, 612 positions of attachment to the loop to constrained VEM layers, which damp the loop motion and, in turn, relative motion of mechanical elements to which posts 602, 604 are attached. In this illustrative embodiment each loop includes four VEM layers 618, one attached to each side of the end tabs 614, 616. Constraining layers 620 are attached to VEM layer pairs on each side of the end tabs 614, 616.

Figure 7A:
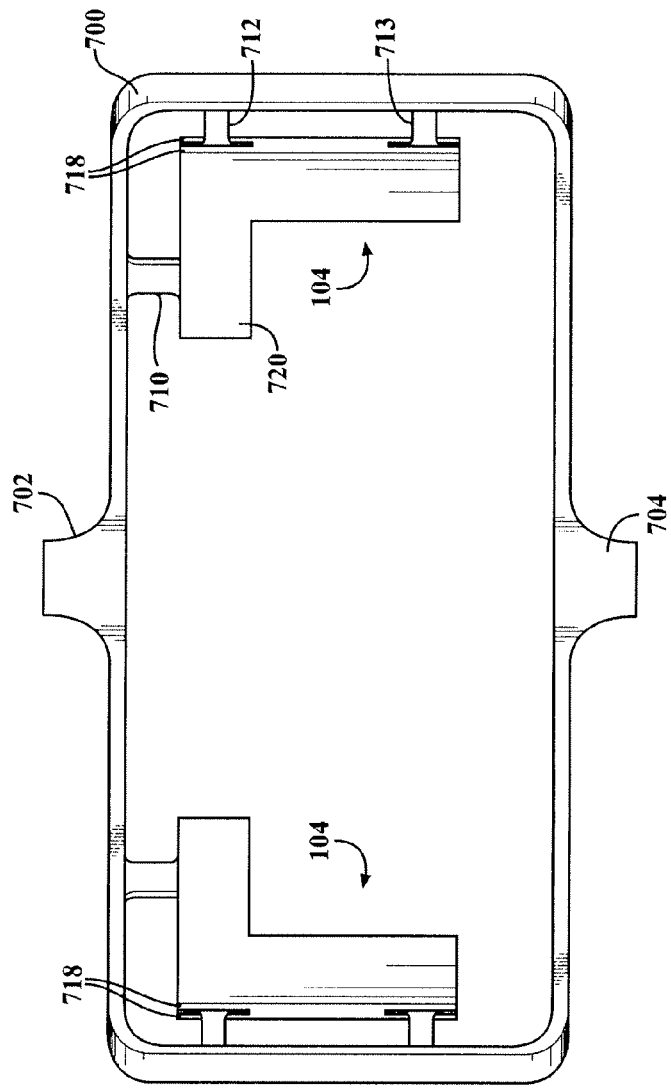
FIGS. 7A and 7B are elevation and plan views, respectively, of an illustrative, double-rectangular-loop embodiment of a vibration isolator in accordance with the principles of the present invention in which the major axes of the constituent rectangular loops are at an angle to one another.
Figure 7B:
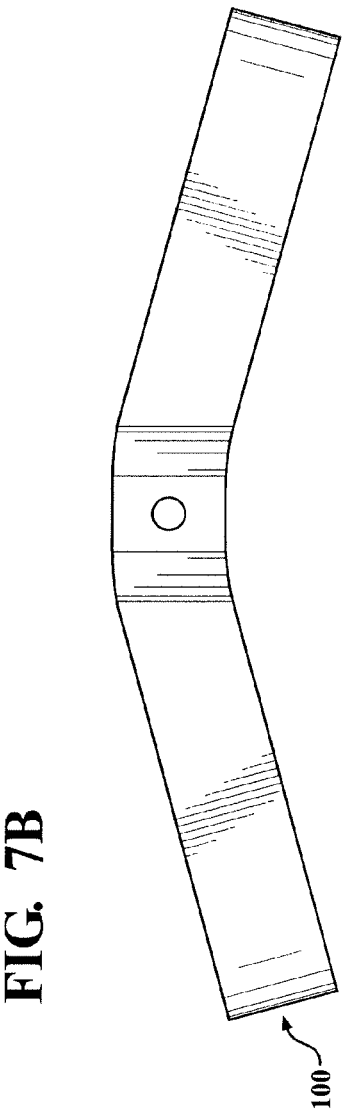

FIGS. 7A and 7B depict landscape and top plan views, respectively, of an illustrative embodiment of a dual-rectangular-loop constrained VEM flexure vibration isolator 100 in accordance with the principles of claimed subject matter. In this illustrative embodiment a dual-loop flexure 700 includes system attachment posts 702, 704 for attachment to system elements that are to be vibrationally isolated. The two loops are generally rectangular in shape. Two constrained layer couplers 104 include three posts 710, 712, 713 and end-tabs 714, 716, 717 (not visible) each. The constrained layer couplers 104 couple relative translational movement from the posts 710, 712, 713 positions of attachment to the loop, to constrained VEM layers, which damp the loop motion. In this illustrative embodiment each loop includes six VEM layers 718, one attached to each side of the end tabs 714, 716, 717. Constraining layers 720 are attached to VEM layer pairs on each side of the end tabs 714, 716, 717. In this illustrative embodiment, as is apparent from the top plan view of FIG. 7B, the major axes of the rectangular loops, in contrast to previous illustrative embodiments, are not in-line. Various design constraints may be addressed by such a configuration.

Figure 8:
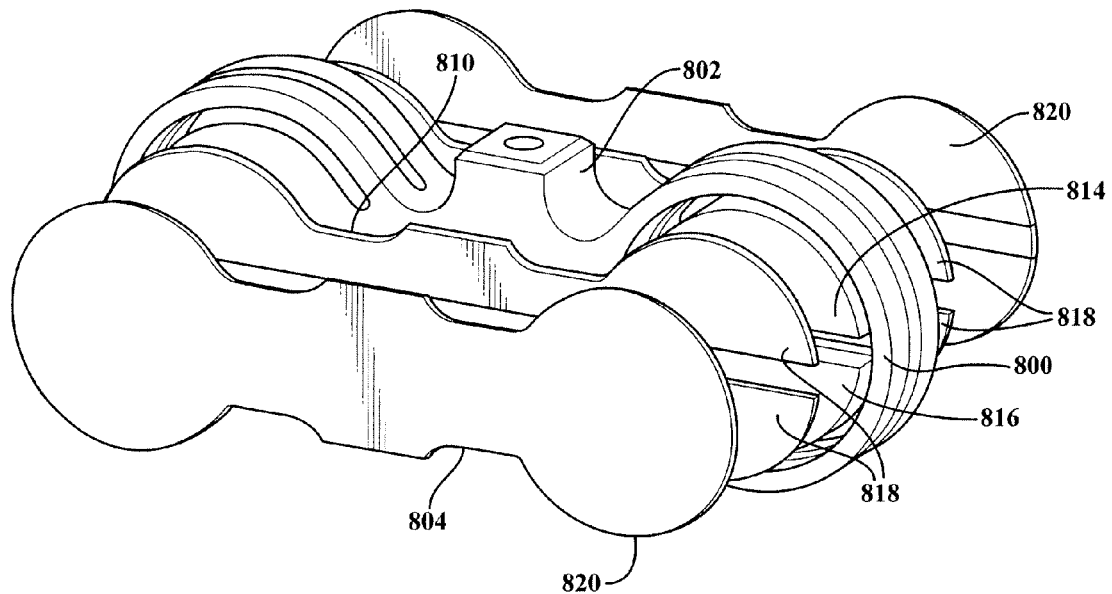
FIG. 8 is an exploded view of an illustrative, double-loop embodiment of a vibration isolator in accordance with the principles of the present invention in which constrained VEM layer couplers are cantilevered.

FIG. 8 depicts an illustrative embodiment of a quad-circular-loop constrained VEM flexure vibration isolator 100. In this illustrative embodiment, a quad-loop flexure 800 includes system attachment posts 802, 804 (not visible) for attachment to system elements that are to be vibrationally isolated. The four loops are generally elliptical/circular in shape. Four constrained layer couplers 104 include two posts 810, 812 and end-tabs 814, 816 each. The constrained layer couplers couple relative translational movement between the posts' 810, 812 positions of attachment to the respective loop to constrained VEM layers 818, which damp the loop motion. In this illustrative embodiment, each loop includes two VEM layers 818, one attached to the "outside" surfaces of the respective end tabs 814, 816. Constraining layers 820 are attached to VEM layer pairs on the "outside" surfaces of VEM layer pairs. In this illustrative embodiment, each VEM layer spans two end-tabs that cover just less than half of two loops. The separation between VEM layers is selected so that, even with the greatest travel of attachment posts 802, 804, the VEM layers do not contact one another. The VEM layer also covers the outside surface of the post, which cantilevers the end-tabs into the interior of the respective loop. A single constraining layer covers two VEM layers (four VEM layer regions) in this illustrative embodiment. This embodiment illustrates one method of maximizing the surface area of the VEM.

Figure 9:
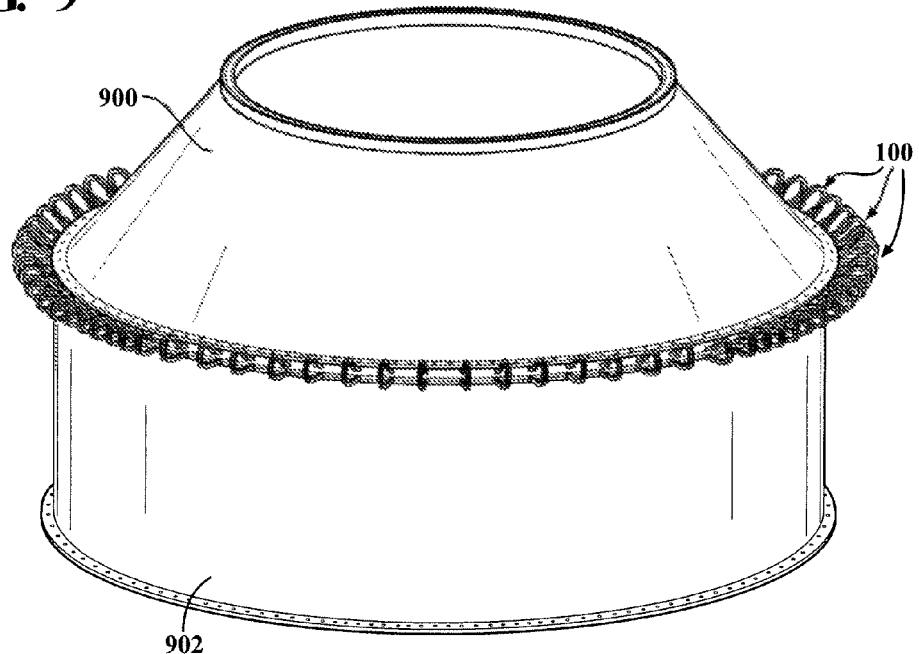
FIG. 9 is a perspective view of a multi-element mechanical system that employs a plurality of illustrative embodiments of vibration isolators in accordance with the principles of the present invention.

A vibration isolator 100 in accordance with the principles of the present invention may be used in combination with other vibration devices of its kind or with conventional vibration isolators to implement a system within which first and second mechanical elements are vibrationally isolated from one another. In an illustrative embodiment, the first and second mechanical elements may be, for example, a payload support structure 900 and launch vehicle 902, respectively, as depicted in the perspective view of FIG. 9. In such an embodiment, vibration isolators 100 may be inserted into mounting locations between the payload support structure 900 and a vehicle 902 or support structure. The attachment proximate portions of the upper and lower flexure sections (e.g., posts 521, 522 of FIG. 5) lay within the fastener footprint of the payload to the support structure and the flexure loop sections lay outside of the fastener footprint. The vibration isolators 100 may be arrayed around the perimeter of an interface flange between a payload and support structure, for example.

The number and location of the isolators, or mounts, 100 may be arranged to develop a desired longitudinal and lateral compliance for an overall vibration isolation system.

Depending upon the particular shape of the interface footprint between a payload and support structure, the shape of the vibration isolator may be varied to minimize the impact of the vibration isolation system on the overall plan profile of the payload and support structure. Concave plan shapes of the vibration isolators 100 may also be employed to allow for the insertion of the isolator 100 into a load path, while keeping the bulk of an isolators loops outside the interface footprint.

The position and general directional relationship of the payload support structure 900 relative to the launch vehicle 902 defines the commonly understood longitudinal direction of the combined vehicle, and, similarly, the upper flexure section and lower flexure sections are considered generally aligned to this longitudinal direction or axis, and herein are so described. The longitudinal axis of the combined vehicle may however be defined in any direction for which loading occurs and for which vibration isolation may be desired for implementation. The description of the disclosed invention as being generally aligned to a common longitudinal axis is not to be construed as being a constraint to any space fixed axis.

The construction of the flexure element can be an assembly and is not limited to the one-piece flexure element that has been depicted. Particularly, the flexure loop sections and/or bridge sections can be detachable from the attachment proximate portions of the flexure element. This allows for replacement or exchange of the loop sections and/or bridge sections for repair or for variation of the device compliances. Flexure loop sections and bridge sections of various stiffnesses can be thus interchanged for modification and refinement of the vibration isolation characteristics of the devices and the system. Varying materials may also be used between the flexure loop sections, the bridge sections, and the attachment proximate portions of the flexure element.

The VEM layer shape, constraining layer shape, and VEM attachment location upon the flexure element may be varied for compliance variation and damping enhancement. Further, the flexure element itself or parts thereof may be of materials offering greater inherent damping, such as beryllium copper.

Within the scope of the invention, the attachment means and attachment proximate portions of the flexure element can be made of an upper array of laterally connected attachment bosses and a lower array of laterally connected attachment bosses where each boss accepts a fastener, clip or other attachment element for attaching a payload or vehicle to the isolation device. For this embodiment, each attachment boss of the upper array has a corresponding attachment boss within the lower array of attachment bosses such that the corresponding boss in the lower array is positioned longitudinally below at a minimal controlled distance. Each pair of upper and lower attachment bosses have at least one flexure loop section connecting them. In one embodiment, the flexure loop sections are paired to effect a generally symmetric arrangement about each end of the attachment boss pair, and the flexure loop sections may further be of multiple pairs. The resulting flexure element is one of multiple, laterally displaced and connected flexure sub-elements wherein the combination of the flexure sub-elements determine the overall lateral and longitudinal stiffness of the vibration isolation device. Within any or all of the flexure loops, or between flexure loops, damping bridges can be effected. Each flexure loop section may have a damping bridge portion or be bridged to other loops so to further enhance the total damping of the vibration isolation device.

The present embodiment's maintenance of a completely high-strength material load path (such as that obtained with aluminum, titanium or steel) through the flexure element provides a more durable and reliable means for connecting a payload and vehicle than that available in other systems of the prior art having a lower-strength elastomer or other easily yieldable material within a serial load path. Near linear load-versus-deflection behavior characteristics are achieved, thus providing for more straightforward, predictable, and relatively temperature invariable vibration isolation frequency than available with those systems of the prior art.

The present embodiment can be utilized in multiplicity to affect a complete payload-to-vehicle vibration isolation system. To affect this system, a device is inserted into any or all mounting locations between a payload and vehicle or support structure. The attachment proximate portions of the upper and lower flexure sections lay within the fastener footprint of the payload to the support structure and the flexure loop sections lay aside of the fastener footprint.

The present embodiment may be used to vibration and shock isolate payloads of virtually any mass and size. One potential application may be the vibration and shock isolation of spacecraft components, such as reaction wheels, cameras, and cryocoolers. The present embodiment is useful for isolate components from vibration and shock input as well as isolating base structures (such as satellite buses) from components producing vibration or shock loads.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments. While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. For example, though the attachment means depicted in the illustrative embodiments have employed a two-hole fastener pattern, the attachment means may be any type available within the mechanical arts and need not be the same for upper and lower attachment means. Therefore, it is intended that claimed subject matter not be limited to the particular embodiments disclosed, but that such claimed subject matter may also include all embodiments falling within the scope of the appended claims, and equivalents thereof.

The invention claimed is:

1. A vibration isolator adapted to be arranged in a load path between two relatively-movable elements, comprising:
   a flexure arranged in the load path to damp relative movement between the elements, the flexure including a loop;
   a plurality of relatively rigid members attached to the loop of the flexure at attachment points;
   a constrained layer of viscoelastic material (VEM) arranged within the loop of the flexure; and
   the relatively rigid members coupling the constrained layer of VEM to the inside of the loop of the flexure to oppose relative translational and rotational motion between the attachment points of the flexure.

2. The vibration isolator of claim 1, wherein each of the relatively rigid members comprises a post.

3. The vibration isolator of claim 2, wherein the flexure includes a plurality of loops aligned along a single axis.

4. The vibration isolator of claim 2, wherein the flexure includes a plurality of loops aligned along a plurality of axes.

5. The vibration isolator of claim 2, wherein the loop of the flexure includes an elliptical loop.

6. The vibration isolator of claim 2, wherein the flexure includes a rectangular loop.

7. The vibration isolator of claim 1, wherein the constrained layer of VEM is arranged in parallel with the load path through the loop of the flexure to damp motion within the loop of the flexure between the attachment points attributable to relative movement between the elements.

8. A vibration isolator adapted to be arranged in a load path between two relatively-movable elements, comprising:
   a first loop flexure arranged in the load path to damp relative movement between the two relatively-movable elements;
   first and second relatively rigid posts having proximal ends attached to the first loop flexure at attachment points, and having end-tabs at their distal ends, each end tab having opposite surfaces;
   four layers of viscoelastic material (VEM), each VEM layer being mounted on a respective one of the first and second post's end-tab surfaces; and
   two constraining layers, each constraining layer attached to a respective two VEM layers on a given side of the first and second post's end-tabs;
   wherein the first and second posts are arranged to couple the constrained layers of VEM to the first loop flexure to oppose relative translational and rotational motion between the attachment points of the first loop flexure; and
   wherein the four layers of VEM that are mounted on the first and second post's end-tab surfaces are arranged in parallel with the load path through the first loop flexure to damp movement within the first loop flexure between the attachment points attributable to relative movement between the two relatively-movable elements.

9. The vibration isolator of claim 8, wherein the first loop flexure further comprises attachment means for attaching the first loop flexure to the two relatively-movable elements in order to damp and isolate vibration between the two relatively-movable elements.

10. The vibration isolator of claim 9, further comprising:
    a second loop flexure arranged in the load path to damp relative motion between the elements;
    third and fourth relatively-rigid posts having proximal ends attached to the second loop flexure at attachment points, and having end-tabs at their distal ends, each end-tab having opposite surfaces;
    four layers of viscoelastic material (VEM), each VEM layer being mounted on a respective one of the third and fourth post's end-tab surfaces; and
    two constraining layers, each constraining layer attached to a respective two VEM layers on a given side of the third and fourth post's end-tabs;
    wherein the third and fourth posts are attached to the second loop flexure at the attachment points to couple the constrained layers of VEM to the second loop flexure to oppose relative translational and rotational motion between the attachment points of the flexure; and
    wherein the four layers of VEM mounted on the third and fourth post's end-tab surfaces are arranged in parallel with the second loop flexure to damp movement within the second flexure loop between the attachment points attributable to relative movement between the elements.

11. The vibration isolator of claim 10, wherein the major axes of the first and second flexures are aligned.

12. The vibration isolator of claim 10, wherein the major axes of the first and second flexures are orthogonal to the load path.

13. A vibration isolator adapted to be arranged in a load path between two relatively-movable elements, comprising:
an isolated component;
a base structure;
a plurality of vibration isolators attached between the isolated component and the base structure;
each of the vibration isolators including:
a loop flexure, wherein the flexure includes attachment means for attachment to the isolated component and base structure in order to support the isolated component and base structure at a predetermined resting distance from one another and to damp and isolate vibration between the two;
first and second relatively rigid members having proximal ends attached to the loop flexure at attachment points, and having end-tabs at their distal ends, each end tab having opposite surfaces;
four layers of viscoelastic material (VEM), each VEM layer being mounted on a respective one of the first and second rigid member's end-tab surfaces; and
two constraining layers, each constraining layer attached to a respective two VEM layers on a given side of the first and second member's end-tabs;
wherein the relatively rigid members are attached at points to couple the constrained layers of VEM to the loop flexure to oppose relative translational and rotational motion between the attachment points of the loop flexure.

14. The apparatus of claim 13, wherein the isolated component comprises a spacecraft and the base structure comprises a launch vehicle.

15. The apparatus of claim 13, wherein each of the vibration isolators further comprise:
a second loop flexure;
third and fourth relatively rigid members having end-tabs proximal ends attached to the second loop flexure at attachment points, and having end-tabs at their distal ends, each end tab having opposite surfaces;
four layers of viscoelastic material (VEM), each VEM layer being mounted on a respective one of the third and fourth rigid member's end-tab surfaces; and
two constraining layers, each constraining layer attached to a respective two VEM layers on a given side of third and fourth rigid members' end-tabs;
wherein the relatively rigid members are attached at points to couple the constrained layers of VEM to the second loop flexure to oppose relative translational and rotational motion between the attachment points of the second loop flexure.

16. A vibration isolation device, comprising:
a flexure element comprising upper and lower flexure sections generally aligned to a common longitudinal axis;
wherein the upper and lower flexure sections each have an attachment means and an attachment proximate portion such that the attachment proximate portion of the upper flexure section is a distance from the attachment proximate portion of the lower flexure section;
wherein the flexure element further comprises at least one flexure loop section;
wherein the attachment proximate portions of the upper and lower flexure sections are connected to one another within the flexure element by the at least one flexure loop section;
wherein across at least one flexure loop section is configured at least one damping bridge, comprising a first bridge section attached to and extending from and within a first portion of at least one flexure loop section and a second bridge section attached to and extending from and within a second portion of at least one flexure loop section;
a viscoelastic material (VEM) layer having first and second facial surfaces such that the first facial surface is attached to both the first and second bridge sections; and
a stiff constraining layer attached to the second facial surface of the VEM layer such that motion of the first bridge section relative to the second bridge section is constrained by the stiff constraining layer and therein induces shearing of the VEM layer.

17. The device of claim 16, wherein the flexure element comprises high strength, linear elastic material.

18. The device of claim 16, wherein the at least one flexure loop section comprises multiple flexure loop sections and each flexure loop section connects the attachment proximate portion of the upper flexure section to the attachment proximate portion of the lower flexure section.

19. The device of claim 18, wherein a damping bridge is configured laterally between the loop sections.

20. The device of claim 18, wherein the multiple flexure loop sections are comprised of four flexure loop sections wherein two parallel loop sections connect the upper flexure section to the lower flexure section at each of two opposing ends of the upper and lower flexure sections.

21. The device of claim 16, wherein the flexure element is of one-piece construction.

22. The device of claim 16, wherein at least one flexure loop section is of rectangular shape.

23. The device of claim 16, wherein the flexure element is an assembly and at least one flexure loop section is detachable from the upper and lower flexure sections and replaceable with flexure loop sections of variable stiffness.

24. The device of claim 18, wherein the flexure loop sections are of varying materials.

25. The device of claim 16, wherein the VEM layer is attached to all the surfaces of the first and second bridge sections which are aligned to the longitudinal axis, and wherein the stiff constraining layer is attached to all the VEM layer surface opposite the VEM layer surface that is attached to the first and second bridge sections.

26. The device of claim 16, wherein the attachment means and attachment proximate portions of the flexure element comprise an upper array of laterally connected attachment bosses and a lower array of laterally connected attachment bosses, wherein each attachment boss of the upper array has a corresponding attachment boss within the lower array of attachment bosses and each pair of upper and lower attachment bosses have at least one flexure loop section connecting them.

27. A vibration isolation mounting system comprising multiple devices of claim 16, wherein a device is inserted in each retained mounting location between a payload and a payload support structure.

28. The system of claim 26, wherein each isolation device has a flexure element of concave plan shape such that the attachment proximate portions of the upper and lower flexure sections of each device are disposed within the fastener footprint of a payload to a support structure and all the flexure loop sections of each device are positionable to the outer side of the fastener footprint.

* * * * *